United States Patent
Lee et al.

(10) Patent No.: US 9,871,719 B2
(45) Date of Patent: *Jan. 16, 2018

(54) COMPUTING SERVICE CHAIN-AWARE PATHS

(71) Applicant: Futurewei Technologies, Inc., Plano, TX (US)

(72) Inventors: Young Lee, Plano, TX (US); Linda Dunbar, Plano, TX (US); Hong Zhang, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/459,918

(22) Filed: Mar. 15, 2017

(65) Prior Publication Data

US 2017/0187609 A1 Jun. 29, 2017

Related U.S. Application Data

(63) Continuation of application No. 14/702,503, filed on May 1, 2015, now Pat. No. 9,634,867.

(60) Provisional application No. 61/987,840, filed on May 2, 2014.

(51) Int. Cl.
    *H04L 12/28* (2006.01)
    *H04L 12/721* (2013.01)
    *H04L 12/24* (2006.01)
(52) U.S. Cl.
    CPC .............. *H04L 45/12* (2013.01); *H04L 41/12* (2013.01)

(58) Field of Classification Search
    CPC .......... H04L 45/00; H04L 45/12; H04L 47/10
    See application file for complete search history.

(56) References Cited

U.S. PATENT DOCUMENTS

| 8,811,172 | B1 | 8/2014 | Sella |
| 2001/0032272 | A1 | 10/2001 | Fujita |
| 2002/0097671 | A1 | 7/2002 | Doverspike et al. |
| 2005/0157697 | A1 | 7/2005 | Lee et al. |
| 2009/0198958 | A1 | 8/2009 | Arimilli et al. |
| 2010/0165881 | A1 | 7/2010 | Hof et al. |
| 2012/0195229 | A1 | 8/2012 | Chen |
| 2013/0107712 | A1 | 5/2013 | Allan |
| 2014/0025970 | A1 | 1/2014 | Shinohara |

(Continued)

OTHER PUBLICATIONS

Parker, R., et al., "Service Function Chaining: Chain to Path Reduction," draft-parker-sfc-chain-to-path-00, Nov. 8, 2013, 11 pages.

(Continued)

*Primary Examiner* — Andrew Lee
(74) *Attorney, Agent, or Firm* — Conley Rose, P.C.

(57) ABSTRACT

A method implemented by a path computation element (PCE), comprising receiving a path computation request to compute a network path for a source-destination pair in a service chain (SC) network, wherein the path computation request comprises at least one network routing constraint and a service function (SF) input associated with a plurality of SFs, computing a plurality of network paths through the network for the source-destination pair according to the network routing constraint, selecting at least a first of the network paths according to the SF input, and sending a path computation response indicating at least the first network path in response to the received path computation request.

20 Claims, 9 Drawing Sheets

(56) References Cited

U.S. PATENT DOCUMENTS

2014/0096183 A1 4/2014 Jain et al.

OTHER PUBLICATIONS

Office Action dated Sep. 21, 2016, 10 pages, U.S. Appl. No. 14/702,503, filed May 1, 2015.
Notice of Allowance dated Dec. 14, 2016, 5 pages, U.S. Appl. No. 14/702,503, filed May 1, 2015.

COMPUTING SERVICE CHAIN-AWARE PATHS

CROSS-REFERENCE TO RELATED APPLICATIONS

The present application is a continuation of U.S. patent application Ser. No. 14/702,503, filed May 1, 2015, by Lee, et al., and entitled "Computing Service Chain-Aware Paths," which claims the benefit of U.S. Provisional Patent Application 61/987,840, filed May 2, 2014, by Lee, et al., and entitled "Computing Service Chain Aware Paths," both of which are incorporated herein by reference as if reproduced in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service chaining refers to a service deployment model that applies a sequence of network services to a data flow in a specific order. A service chaining deployment model may insert Open Systems Interconnection (OSI) Layer 4 (L4) to Layer 7 (L7) services in data-forwarding paths between peers. Some examples of L4 to L7 services may include firewalls, wide area network (WAN) and application accelerations, server load balancing, network address translations (NATs). The L4 to L7 services are commonly located at a centralized location, for example, at a data center (DC) gateway. Thus, data-forwarding may direct all traffic for a data flow to traverse through the DC gateway. However, the DC gateway may become a high traffic location, and thus may not be efficient.

A more efficient service chaining deployment model may leverage recent development of network functions virtualization (NFV) and software defined networking (SDN) technologies. NFV enables the migration of services from dedicated hardware to software and/or virtual machines (VMs). SDN enables the separation of control and forwarding functions and a software programmable control plane. For example, services may be implemented as software components, moved out of the centralized location, and instantiated at multiple locations in the network by employing NFV. Data flows may be steered through the service instance locations by employing the SDN model, where a network controller may configure network nodes with data-forwarding instructions.

SUMMARY

In one embodiment, the disclosure includes a method implemented by a path computation element (PCE), comprising receiving a path computation request to compute a network path for a source-destination pair in a service chain (SC) network, wherein the path computation request comprises at least one network routing constraint and a service function (SF) input associated with a plurality of SFs, computing a plurality of network paths through the network for the source-destination pair according to the network routing constraint, selecting at least a first of the network paths according to the SF input, and sending a path computation response indicating at least the first network path in response to the received path computation request.

In another embodiment, the disclosure includes a method implemented by a network controller, comprising obtaining SC information associated with an SC that associated with a plurality of SFs, obtaining a node-SF map indicating network locations of the SFs, sending a path computation request message to request a path computation for a source-destination pair according to at least one network routing constraint, the SC information, and the node-SF map, and receiving a path computation response message comprising a route list in response to the path computation request message, wherein the route list comprises one or more network paths for the source-destination pair, and wherein each network path satisfies the network routing constraint and traverses through at least some the network locations of the SFs.

In yet another embodiment, the disclosure includes a network element (NE) comprising a receiver configured to receive a path computation request message comprising a source-destination pair, at least one network routing constraint, and an SF input associated with a plurality of SF types, a processor coupled to the receiver and configured to obtain network topology information, compute a plurality of shortest paths according to the network topology information and the network routing constraint, and select a first of the shortest paths according to the SF input, and a transmitter coupled to the processor and configured to send a path computation response message comprising at least the first shortest path.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

In a network functions virtualization (NFV) environment, a network service or a service function (SF) may be instantiated at multiple locations in a network. For example, a network address translation (NAT) type-44 (NAT 44) SF may comprise two different SF instantiations, one that applies a policy A (e.g., NAT 44-A) and another that applies a policy B (e.g., NAT 44-B). In addition, different SF instances may comprise different capabilities. For example, one NAT 44-A instance may support a data throughput of about 10 gigabit per second (Gbps), while another NAT 44-A may support a data through of about 100 Gbps. The SF instances may be referred to as SF instance components (SFICs). Each SFIC may be identified by a unique address. The address of an SFIC is described as a locator in Internet Engineering Task Force (IETF) document draft-parker-sfc-chain-to-path.txt, which is incorporated herein by reference.

In an SC network, some SFICs may be located in close proximity with each other, while some other SFICs may be located further apart and may be attached to different service function forwarder (SFF) nodes. SFF nodes are SF steering nodes that forward data traffic to one or more attached SFICs. In an NFV environment, there may be a large number of SFICs for each SF in a network. Thus, NFV may increase the likelihood of SFICs' state and/or attachment changes, for example, due to creation, deletion, and/or migration of SF instances. At a functional level, the order at which SFs are applied is important for a SF chain, but the particular instance or the particular SFIC that is selected for an SF may not be as important. For example, an SC, denoted as SC1, may be composed from an ordered set of SFs, denoted as {SF1, SF4, SF 6}. SF1, SF4, and SF6 refer to network services of type 1 (e.g., firewall), type 4 (e.g., NAT), and type 6 (e.g., encryption), respectively. Thus, SFs may also be referred to as SF types. Any instances or SFICs of SF1, SF4, or SF 6 may be applied to data traffic corresponding to SC1 provided that the SF1, SF4, and SF6 are applied in the order as specified for SC1. When an SF is instantiated with multiple SFICs, some SFICs may be reached by different network nodes. The selection of a particular set of SFICs for an SC creates a service path. As such, a service path is an instantiation of an SC, where the service path comprises a sequence of SF instances or SFICs that implement each SF type specified for the SC. The determination and/or computation of service paths may be important for service chaining.

Disclosed herein are various embodiments for computing SC-aware network paths by employing both SC information and network routing constraints. SC information comprises an SC information base, a node-SF map, and any other SC-related information, such as policies, user profiles, and radio access network (RAN) statuses. An SC information base identifies a plurality of SCs, each comprising an SF sequence, which is an ordered set of SFs or SF types. A node-SF map comprises mappings between SFs and the locations of the network nodes that provide the SFs. A network node that provides one or more SFs is known as an SF steering node or an SF node. An SF steering node may be referred to as an SFF, which may steer traffic to one or more local SFs or external SFs located at other network nodes. An SF node is a network node that provides a particular SF. A network routing constraint may comprise a quality-of-service (QoS) parameter, such as, delay or bandwidth, and may be defined in the form of a network routing objective function. In an embodiment, an SC orchestration entity creates and manages SCs in an SC domain and sends SC information to a software defined networking (SDN) controller to enable the SDN controller to determine SC-aware paths for implementing the SCs in the SC domain. The SDN controller determines network routing constraints (e.g., delay, bandwidth, and minimum hop criteria) and coordinates with an SC-aware path computation element (PCE) to determine SC-aware network paths. For example, the SDN controller may request the SC-aware PCE to compute a network path from an ingress node to an egress node for a particular SC based on the SC information and the network routing constraints. Upon receiving the request, the SC-aware PCE obtains network topology information and computes K shortest paths (e.g., minimum link cost paths) from the SC ingress node to the SC egress node according to the network topology information and the network routing constraints. The network topology information may include network nodes, interconnecting links, and associated link costs. After computing K shortest paths, the SC-aware PCE selects one or more candidate paths from the K shortest paths according to the SC information. For example, a path is selected as a candidate path when the path traverses through the SFs and/or SF instances and in the same order as specified for the SC. After selecting the candidate paths, the SC-aware PCE prunes the set of candidate paths by selecting the candidate path with the minimum-hop and provides the minimum-hop path to the SDN controller. Subsequently, the SDN controller configures network nodes along the minimum-hop path. In an embodiment, when more than one minimum-hop paths are identified for a particular pair of SC ingress and egress nodes, the SDN controller may choose one minimum-hop path by employing some other routing criteria or defer the decision to another network node in the network, for example, the SC ingress node, by providing the network node with all the minimum-hop paths. Thus, the disclosed embodiments enable service-aware path selections in an SC network.

Figure 1:
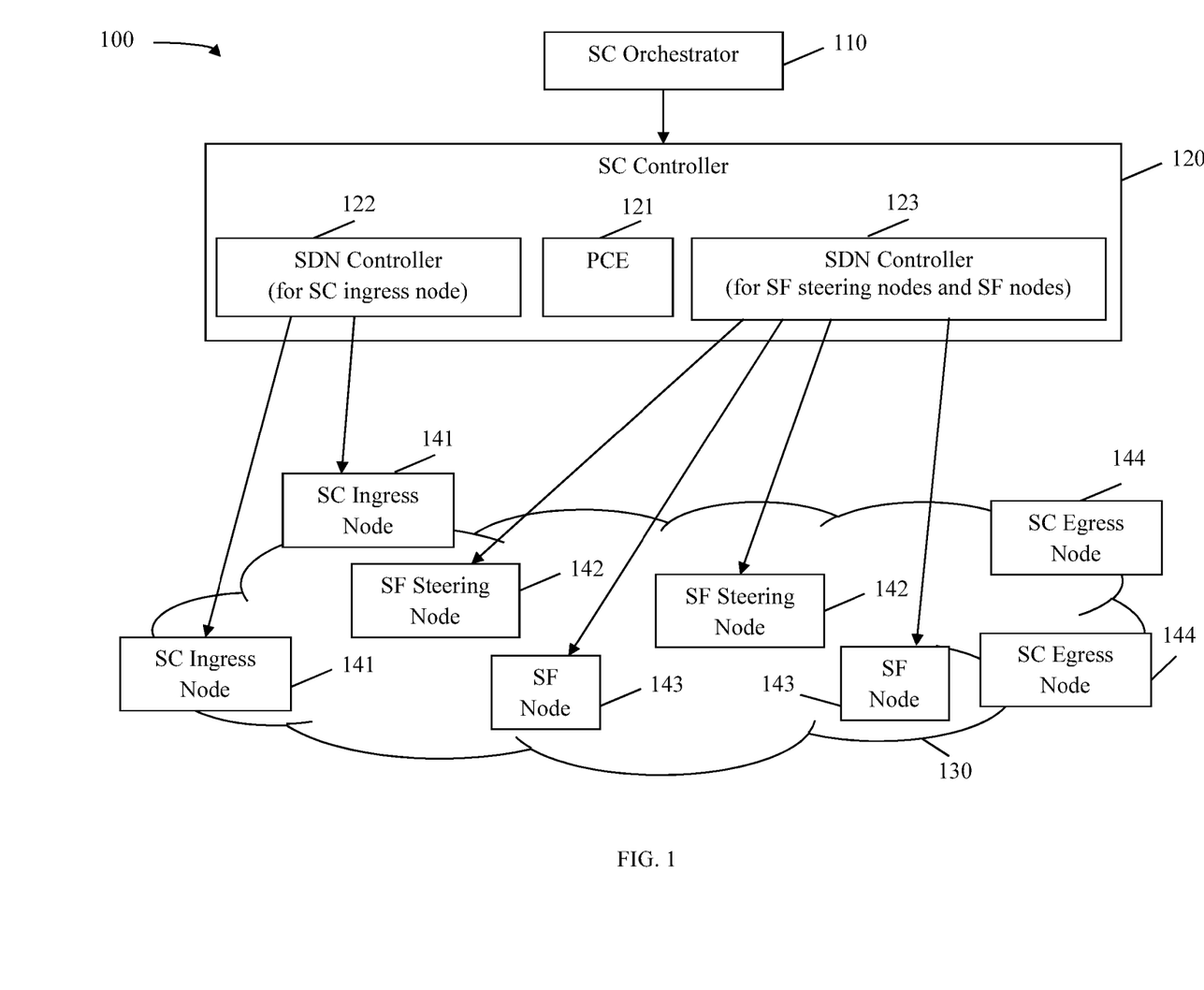
FIG. 1 is a schematic diagram of an embodiment of a service chain (SC)-enabled network system.

FIG. 1 is an embodiment of an SC network system 100. The system 100 comprises an SC orchestrator 110 in data communication with an SC controller 120. The SC controller 120 comprises a PCE 121, a first SDN controller 122, and a second SDN controller 123. The first SDN controller 122 and the second SDN controller 123 are in data communication with a network 130. The network 130 is a service overlay network. The underlying physical network of the network 130 may comprise an electrical network, an optical network, and/or any types of physical network suitable for transporting data. The network 130 may comprise one or more network domains. The network 130 may employ any transport protocols, such as an Internet Protocol (IP)/User Datagram Protocol (UDP), suitable for transporting data over the underlying physical network. The network 130 may employ any types of network virtualization and/or network overlay technologies, such as a virtual extensible local area network (VXLAN). In an embodiment, the network 130 is an SDN-enabled network, where network control is decoupled from data-forwarding and the control plane is programmable through software controlled by one or more centralized management entities, such as the first SDN controller 122 and the second SDN controller 123, as discussed more fully below. The network 130 comprises one or more SC ingress nodes 141, a plurality of SF steering nodes 142, a plurality of SF nodes 143, and one or more SC egress nodes 144. The SC ingress nodes 141, the SF steering nodes 142, the SF nodes 143, and the SC egress nodes 144 are SC entities, which participate in SC operations, as discussed more fully. The network 130 may further comprise a plurality of other network nodes (e.g., data-forwarding nodes) that are unaware of SCs, SFs, and/or SC operations.

The SC orchestrator 110 may be one or more virtual machines (VMs), a system, a distributed system, or any other device and/or system comprising a plurality of computing devices configured to create and manage SCs and/or service overlay topologies. An SC comprises a sequence of SFs arranged in a specific order. The SC orchestrator 110 is acting as an SC-administrative entity over an SC domain operating in the network 130. For example, the SC orchestrator 110 may create an SC to serve an application by determining a series of SFs, such as firewall or policy routing, to form a composite service for implementing the application. The SC orchestrator 110 may assign an SC identifier (ID) to the SC and may maintain an SC information base to store the SC ID, a SF sequence of the SFs corresponding to the SC, and policies associated with the SC. The SC orchestrator 110 may also discover and/or locate the locations (e.g., network nodes) of the SFs in the network 130. For example, a particular SF or SF type may be instantiated into multiple instances distributed at various locations in the network 130. The SC orchestrator 110 may further maintain a node-SF map to track the locations or the network nodes that provide the SFs. For example, the node-SF map may comprise a one-to-many mapping between an SF or SF type and the locations of the SF. The SC orchestrator 110 coordinates with the SC controller 120 to create overlay service paths in the network 130. For example, the SC orchestrator 110 may send the SC information base and the node-SF map to the SC controller 120 and request the SC controller 120 to compute service overlay paths in the network 130 to enable the implementation of the SC. The SC orchestrator 110 may further maintain a service topology map to track the service overlay paths in the network 130.

The PCE 121 may be a software component (e.g., a VM) or any device configured to compute network paths through the network 130. For example, the PCE 121 may obtain network topology information (e.g., network nodes and interconnecting links) of the network 130 and compute a network path from an SC ingress node 141 to an SC egress node 144, and traversing through locations of the SFs according to the SC information. The computed network paths may be referred to as service overlay paths or service paths, which are instantiations of an SC.

The first SDN controller 122 and the second SDN controller 123 may be one or more VMs, a system, a distributed system, or any other device and/or system comprising a plurality of computing devices configured to perform SDN control functions and to facilitate SCs as instructed by the SC orchestrator 110. Some examples of SDN control functions may include making routing decisions and configuring network nodes, such as the SC ingress node 141, the SF steering nodes 142, the SF nodes 143, the SC egress nodes 144, and/or any other network nodes in the network 130. For example, the first SDN controller 122 and the second SDN controller 123 may coordinate with the PCE 121 to determine data-forwarding paths or more specifically, service paths through the network 130. After the service paths are determined, the first SDN controller 122 may configure the SC ingress nodes 141 and the second SDN controller 123 may configure the SF steering nodes 142 and/or the SF nodes 143. The first SDN controller 122 and/or the second SDN controller 123 may further configure other network nodes (e.g., data-forwarding nodes) in the network 130 to facilitate data-forwarding along the service paths.

The SC ingress nodes 141 may be routers, switches, or any other network devices configured to perform SC classification. The SC ingress nodes 141 may be referred to as a classifier or an SC classifier. The SC ingress node 141 may be positioned at a boundary or an edge of an SC domain. For example, an SC ingress node 141 receives incoming data traffic from a source endpoint or an end user, which may be external to the SC domain. The SC ingress node 141 classifies the data traffic and determines a set of SFs (e.g., for a particular SC) that may be applied to the data traffic, for example, according to SC classification rules. After determining a set of SFs, the SC ingress node 141 selects a service path or a network path for the data traffic, for example, based on configurations received from the first SDN controller 122. In one embodiment, the SC ingress node 141 may be configured with a particular network path for a particular data flow. In another embodiment, the SC ingress node 141 may be configured with SC information and a plurality of service paths. In such an embodiment, the SC ingress node 141 may select a service path as data arrives at the SC ingress node 141. After selecting a service path, the SC ingress node 141 assigns a service path identifier (ID) to the data traffic such that the incoming traffic may be steered through the SF locations, such as the SF steering nodes 142 and/or the SF nodes 143, accordingly. In an embodiment, the SC ingress node 141 may attach the service path ID and/or any other information associated with the SC and/or the service path to the data before forwarding the data to a next-hop node in the service path to facilitate traffic steering at subsequent network nodes along the service path. It should be noted that data traffic for an SC may enter the network 130 via one or more SC ingress nodes 141. In addition, an SC ingress node 141 may serve one or more SCs.

The SF steering nodes 142 may be routers, switches, or any other network devices configured to forward data received from the network 130 to one or more SFs (e.g., firewalls and NATs), which may be local components located within the SF steering nodes 142 or external components located external to the SF steering nodes 142. The SF steering nodes 142 may also be referred to as SF switching nodes or SFFs. The SF steering nodes 142 forward the received data to the SFs according to a specific order, which may be pre-configured by the second SDN controller 123.

The SF nodes 143 may be routers, switches, or any other network devices configured to provide one or more SFs or instantiations of one or more SFs (e.g., software components). For example, an SF node 143 may correspond to an external SF component associated with a particular SF steering node 142 or a standalone SF component. In an embodiment, a particular SF or SF type may be instantiated at multiple locations, for example, at one or more SF steering nodes 142 and/or one or more SF nodes 143, in the network 130.

The SC egress nodes 144 may be routers, switches, or any other network devices configured to handle traffic leaving an SC domain. The SC egress node 144 may be positioned at a boundary or an edge of an SC domain and may deliver data to a destination endpoint located outside of the SC domain. For example, data may enter an SC domain at an SC ingress node 141, traverses through a service path as directed by the SC ingress node 141, and arrives at an SC egress node 144.

When the data traverses through the service path, the data may be processed by corresponding SFs located at the SF steering nodes 142 and/or the SF nodes 143. As described earlier, the SC ingress nodes 141 may attach SC and/or service path information to a data packet and/or frame. Thus, an SC egress node 144 may remove any SC and/or service path information prior to delivering the data to a destination endpoint. It should be noted that the system 100 may be configured as shown or alternatively configured as determined by a person of ordinary skill in the art to achieve the same functionalities.

Figure 2:
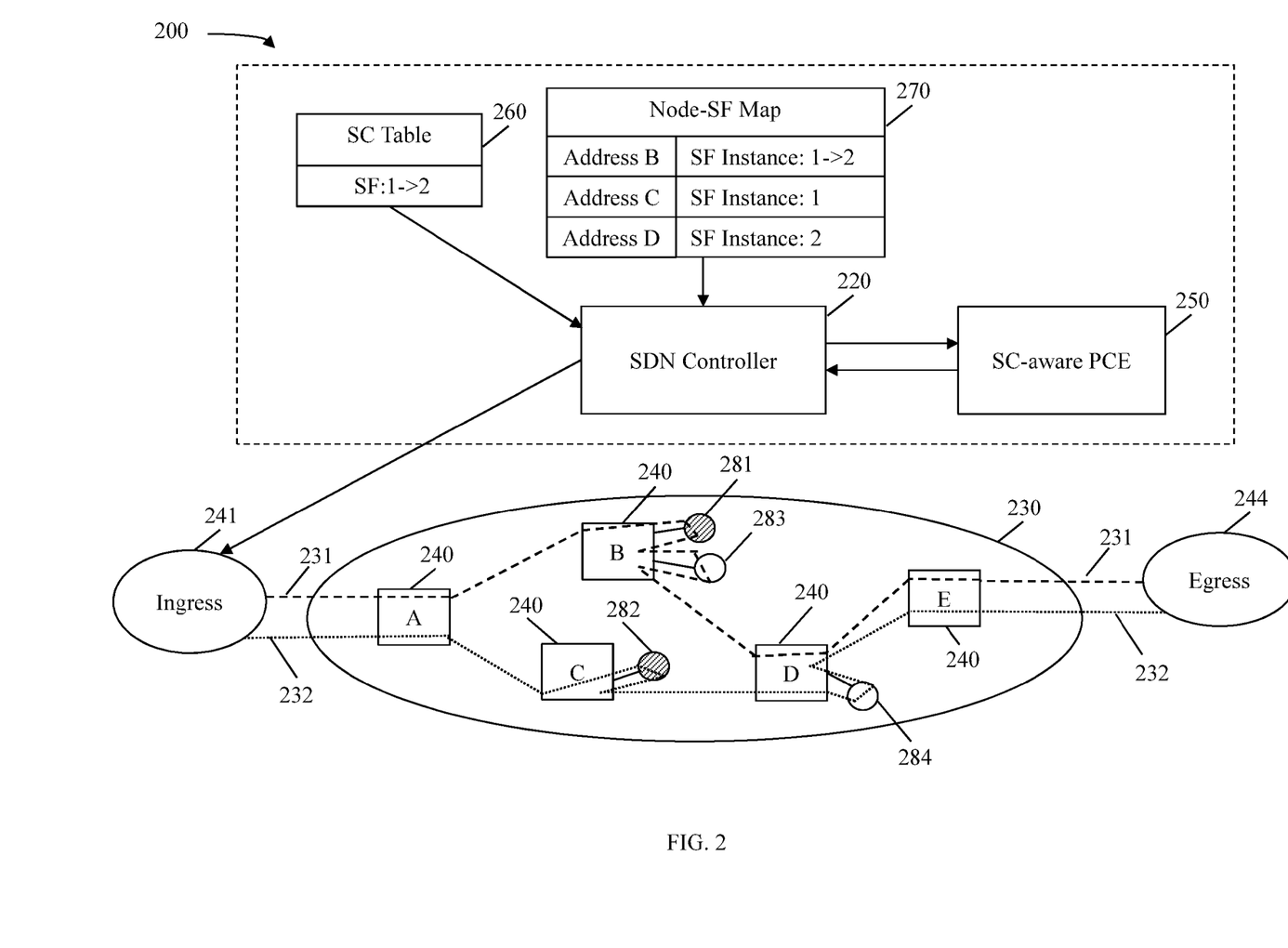
FIG. 2 is a schematic diagram of an embodiment of an SC-aware path computation architecture.

FIG. 2 is a schematic diagram of an embodiment of an SC-aware path computation architecture 200. The architecture 200 may be applied to an SC network system, such as the system 100, to perform SC-aware path selection in the SC network system. The SC-aware path computation architecture 200 comprises an SDN controller 220, an SC-aware PCE 250, an SC table 260, and a node-SF map 270. The SC-aware path computation architecture 200 may be employed to select SC-aware paths in a network 230. The network 230 is similar to the network 130 and comprises an SC ingress node 241, a plurality of network nodes 240 (e.g., A, B, C, D, and E), and an SC egress node 244. The SC ingress node 241 is similar to the SC ingress nodes 141. The SC egress node 244 is similar to the SC egress nodes 144. The network nodes 240 are networking devices suitable for data-forwarding and may be associated with one or more SFs. For example, the network nodes B, C, and D 240 are SC-aware nodes, such as the SF steering nodes 142 and the SF nodes 143, which may steer data through one or more SFs that are located locally or externally, whereas the network nodes A and E 240 are SC-unaware nodes.

The SC table 260 is an information base comprising SC profiles, which may include an SF sequence (e.g., SF type 1 followed by SF type 2) corresponding to an SC, one or more filters for the SC, and/or any other SC-related information, such as SC policy information, service requirements (e.g., bandwidth). Some examples of SF types may include firewall, policy routing, encryption, video optimization, transmission control protocol (TCP) acceleration, and/or any other SF types suitable for service chaining. The filters may comprise network addresses and/or Internet Protocol (IP) prefixes (e.g., 10.1.1.X or 192.X.X.X), which may be employed for associating a data flow to the SC. For example, a filter may indicate a network address of the SC ingress node 241 and a network address of the SC egress node 244. The node-SF map 270 is an information base that indicates network addresses of the network nodes 240 that are associated with one or more SFs and identifiers of the SFs and/or SF instances. As shown, SF type 1 is instantiated twice in the network 230, a first SF type 1 instance 281 may be reached via node B 240 and a second SF type 1 instance 282 may be reached via node C 240. Similarly, SF type 2 is instantiated twice in the network 230, a first SF type 2 instance 283 may be reached via node B 240 and a second SF type 2 instance 284 may be reached via node D 240. The SC table 260 and the nodes-SF map 270 are described more fully below.

The SDN controller 220 is similar to the first SDN controller 122 and the second SDN controller 123. The SDN controller 220 is communicatively coupled to the network 230 and the SC-aware PCE 250. In addition, the SDN controller 220 may interface with an SC orchestrator, such as the SC orchestrator 110, to receive SC information, such as the SC table 260 and the node-SF map 270. The SDN controller 220 is configured to determine a network path from the SC ingress node 241 to the SC egress node 244 via one or more of the network nodes 240 by employing the received SC information. The SDN controller 220 may determine network routing constraints (e.g., delay, bandwidth, minimum-hop criterion) or coordinate with other management entities to determine the network routing constraints and coordinate with the SC-aware PCE 250 to compute the network path. The SDN controller 220 may provide the SC table 260, the node-SF map 270, and the network routing constraints to the SC-aware PCE 250 and request the SC-aware PCE 250 to select a path that satisfies the network routing constraints (e.g., in the form of a network routing objective function), the SC table 260, and the node-SF map 270.

The SC-aware PCE 250 may be a software component (e.g., a VM) or any device configured to compute SC-aware network paths through the network 230 by considering both network routing constraints and SC information. For example, the SC-aware PCE 250 may obtain network topology information of the network 230 and compute a network path via one or more network nodes 240 from the SC ingress node 241 to the SC egress node 244. In some embodiments, the network topology information may be stored in a traffic engineering database (TED), which may include network nodes, interconnecting links, and link costs (e.g., delays and bandwidths) associated with the links. The SC-aware PCE 250 may employ a shortest path algorithm to determine a network path according to the network constraints. For example, the SC-aware PCE 250 computes K shortest paths from the SC ingress node 241 to the SC egress node 244 according to the network topology information and the network routing constraints received from the SDN controller 220. After computing the K shortest paths, the SC-aware PCE 250 selects only the paths that satisfy the SC information indicated in the SC table 260 and the node-SF map 270 received from the SDN controller 220. The SC-aware PCE 250 may provide a route list comprising one or more SC-aware paths to the SDN controller 220. For example, when multiple paths satisfy the SC information, the SC-aware PCE 250 may provide the path that comprises the minimum number of hops (e.g., based on the network routing constraints) to the SDN controller 220. When more than one minimum-hop paths satisfy the SC information, the SC-aware PCE 250 may provide all the computed minimum-hop paths to the SDN controller 220.

In an embodiment, the SC-aware PCE 250 may determine two SC-aware paths, a first SC-aware path 231 (shown as dashed lines) and a second SC-aware path 232 (shown as dotted lines) through the network 230 from the SC ingress node 241 and the SC egress node 244. As shown, the first SC-aware path 231 traverses through the nodes A, B, D, and E 240 and a second SC-aware path 232 traverses through the nodes A, C, D, and E 240. The first SC-aware path 231 traverses through the first SF type 1 instance 281 and the first SF type 2 instance 283 at the node B 240, while the second SC-ware path 232 traverses through the second SF type 1 instance 282 at node C 240 and the second SF type 2 instance 284 at node D 240.

Figure 3:
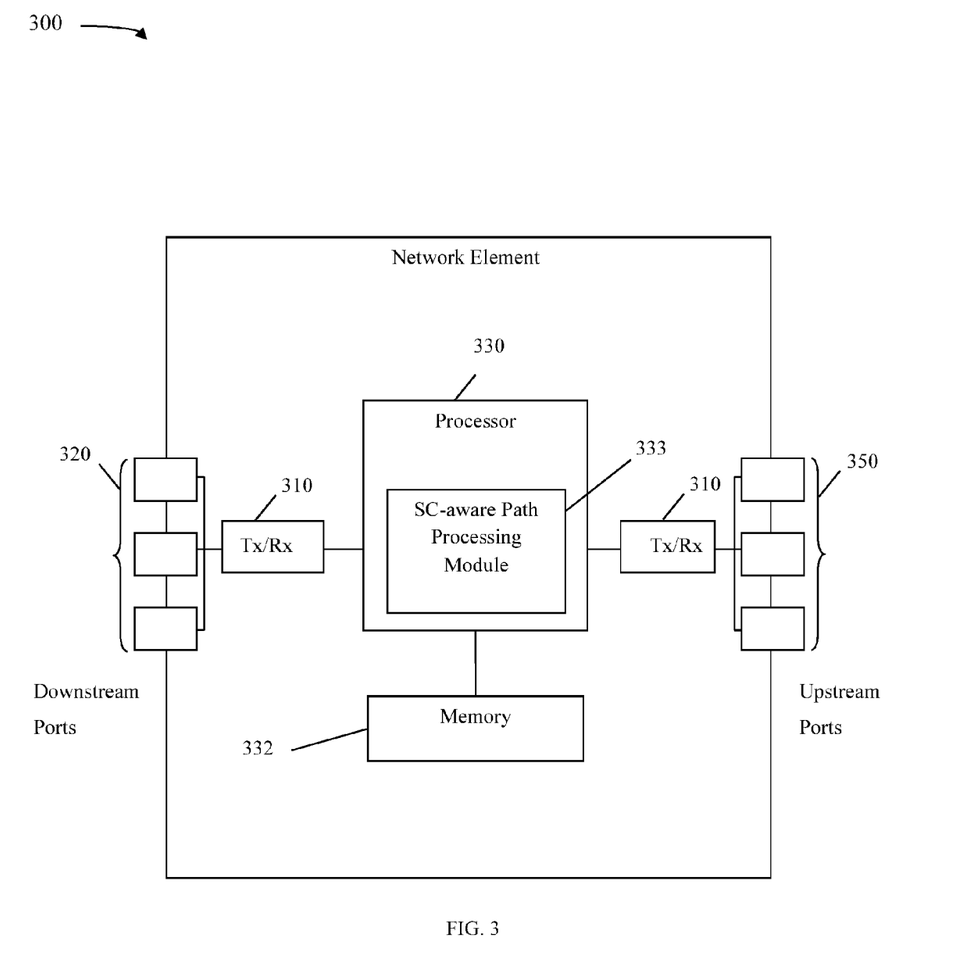
FIG. 3 is a schematic diagram of an embodiment of a network element (NE), which may act as a node in an SC-enabled network.

FIG. 3 is a schematic diagram of an example embodiment of an NE 300, which may act as a node in an SC network, such as the system 100 and architecture 200. For instance, the NE 300 may be an SC-aware PCE, such as the SC-aware PCE 250, an SDN controller, such as the SDN controller 220, an SC ingress node, such as the SC ingress nodes 141 and 241, an SF steering node, such as the SF steering node 142, an SF node, such as the SF node 143, an SC egress nodes 144 and 244, and/or any network nodes, such as the network nodes 240, in the SC network. NE 300 may be configured to implement and/or support the SC-aware network path computation mechanisms described herein. NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 300. For instance, the features and/or methods in the disclosure may be implemented using hardware, firmware, and/or software installed to run on hardware. As shown in FIG. 3, the NE 300 may comprise transceivers (Tx/Rx) 310, which may be transmitters, receivers, or combinations thereof. A Tx/Rx 310 may be coupled to plurality of downstream ports 320 for transmitting and/or receiving frames from other nodes and a Tx/Rx 310 may be coupled to plurality of upstream ports 350 for transmitting and/or receiving frames from other nodes, respectively. A processor 330 may be coupled to the Tx/Rx 310 to process the frames and/or determine which nodes to send the frames to. The processor 330 may comprise one or more multi-core processors and/or memory devices 332, which may function as data stores, buffers, etc. The processor 330 may be implemented as a general processor or may be part of one or more application specific integrated circuits (ASICs) and/or digital signal processors (DSPs). The processor 330 may comprise an SC-aware path processing module 333, which may perform processing functions of an SDN controller, an SC-aware PCE, or an SC ingress node and implement methods 600, 700, 800, and/or 900, as discussed more fully below, and/or any other method discussed herein. As such, the inclusion of the SC-aware path processing module 333 and associated methods and systems provide improvements to the functionality of the NE 300. Further, the SC-aware path processing module 333 effects a transformation of a particular article (e.g., the network) to a different state. In an alternative embodiment, the SC-aware path processing module 333 may be implemented as instructions stored in the memory devices 332, which may be executed by the processor 330. The memory device 332 may comprise a cache for temporarily storing content, e.g., a random-access memory (RAM). Additionally, the memory device 332 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 332 may be configured to store one or more SC information bases, such as the SC table 260, and one or more node-SF maps, such as the node-SF map 270.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
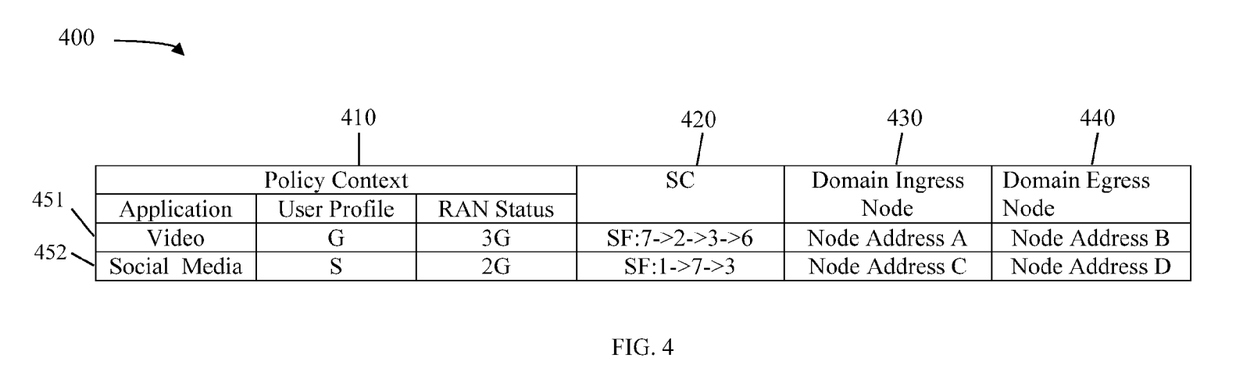
FIG. 4 is a schematic diagram of an embodiment of an SC table.

FIG. 4 is a schematic diagram of an embodiment of an SC table 400. The SC table 400 may be generated by an SC orchestrator, such as the SC orchestrator 110, and employed by an SDN controller, such as the SDN controller 220, and an SC-aware PCE, such as the SC-aware PCE 250, in an SC network, such as the network 230. The SC table 400 is similar to the SC table 260 and provides a more detailed view of the stored information. The SC table 400 comprises policy context information 410, SC information 420, SC ingress node (e.g., the SC ingress nodes 141 and 241) addresses 430 for an SC domain, SC egress node (e.g., the SC egress nodes 144 and 244) addresses 440 for the SC domain. The policy context information 410 may include, but is not limited to, metadata that describes an application type, a user profile, and RAN statuses. For example, a RAN may be a first generation (1G) wireless network, a second generation (2G) wireless network, a third generation (3G) wireless network, a fourth generation (4G) wireless network, or a fifth generation (5G) wireless network. The SC information 420 describes SF sequences of SCs. As shown, a first entry 451 describes a first SC composed of an ordered set of SFs {7, 2, 3, 6} with an ingress port at SC ingress node address A and an egress port at SC egress node address B. A second entry 452 describes a second SC composed of an ordered set of SFs {1, 7, 3} with an ingress port at SC ingress node address C and an egress port at SC egress node address D. The SC table 400 may further comprise a plurality of entries similar to the first entry 451 and the second entry 452.

Figure 5:
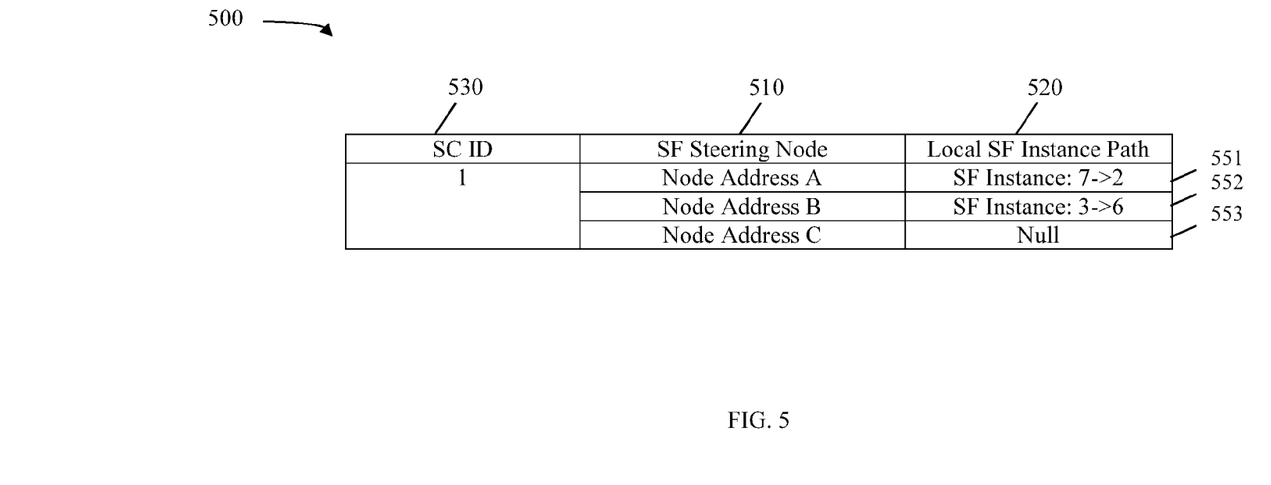
FIG. 5 is a schematic diagram of an embodiment of a node-service function (SF) map.

FIG. 5 is a schematic diagram of an embodiment of a node-SF map 500. The node-SF map 500 may be generated by an SC orchestrator, such as the SC orchestrator 110, and employed by an SDN controller, such as the SDN controller 220, and an SC-aware PCE, such as the SC-aware PCE 250, in an SC network, such as the network 230. The node-SF map 500 is similar to the node-SF map 270 and may provide a more detailed view of the stored information. The node-SF map 500 provides network locations of SFs and/or SF instances. The node-SF map 500 comprises SC ID 530 and mappings between SF steering node (e.g., the nodes 240, SF steering nodes 142, and SF nodes 143) addresses 510 and local SF instance path 520 reached or provided by the network nodes and associated with the SC ID 530. The node-SF map 500 comprises a first entry 551, a second entry 552, and a third entry 553 associated with an SC identified by SC ID 1. The first entry 551 indicates a first network node A that provides an SF type 7 instance followed by an SF type 2 instance (e.g., SF Instance: 7->2 ). The second entry 552 indicates a second network node B that provides an SF type 3 instance followed by an SF type 6 instance (e.g., SF Instance 3->6). The third entry 553 indicates a third network node C that is not associated with any SFs for the SC identified by SC ID 1. For example, the third network node C may be an SC egress node for the SC identified by SC ID 1. The node-SF map 500 may further comprise a plurality of entries similar to the first entry 551, the second entry 552, and/or the third entry 553 associated with the same SC and/or other SCs.

Figure 6:
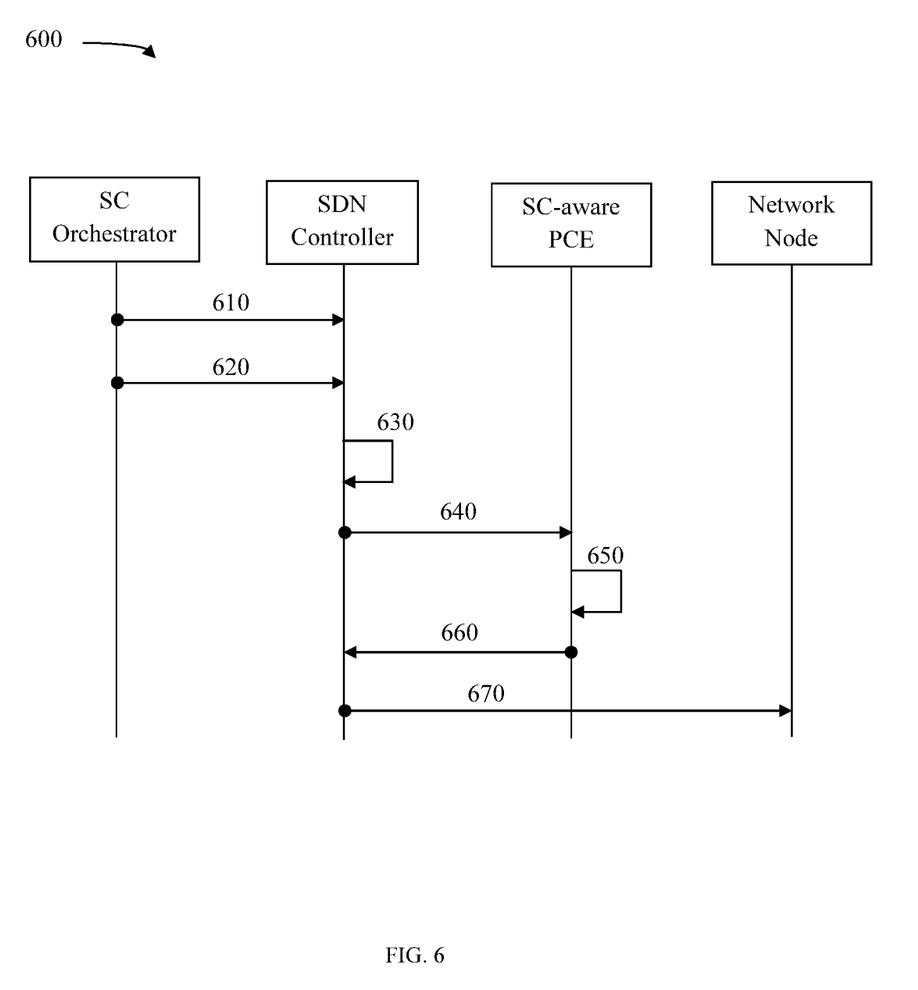
FIG. 6 is a protocol diagram of an embodiment of an SC-aware computation method.

FIG. 6 is a protocol diagram of an embodiment of an SC-aware provision method 600. The method 600 is implemented between an SC orchestrator, such as the SC orchestrator 110, an SDN controller, such as the SDN controller 220, an SC-aware PCE, such as the SC-aware PCE 250, and a network node, such as the network nodes 240, the SC ingress nodes 141 and 241, the SF steering nodes 142, and the SF nodes 143, in an SC network, such as the network 230. The method 600 employs similar mechanisms as described in the architecture 200. The method 600 is implemented after the SC orchestrator creates an SC. At step 610, the SC orchestrator sends an SC table, such as the SC tables 260 and 400, to the SDN controller. The SC table comprises SC information, such as SF sequence, policy context, SC ingress node address, SC egress node address, and/or service requirements for the SC. At step 620, the SC orchestrator sends a node-SF map, such as the node-SF maps 270 and 500, to the SDN controller. The node-SF map provides network locations of SFs in the network. At step 630, after receiving the SC table and the node-SF map, the SDN controller determines to compute network paths for the SC and may determine a network objective function, for example, minimum bounds for some network routing performance parameters or QoS parameters. At step 640, the SDN controller requests the SC-aware PCE to compute paths from an SC ingress node, such as the SC ingress nodes 141 and 241, to an SC egress node, such as the SC egress nodes 144 and 244, and may provide the SC-aware PCE with the network objective function, the SC table, and the node-SF map.

At step 650, upon receiving the request, the SC-aware PCE computes network paths according to the network objective function, the SC table, and the node-SF map. For example, the SC-aware PCE may obtain network topology information about the network and apply a K shortest path algorithm to compute K shortest paths from the SC ingress node to the egress node according to the network objective function. After finding the K shortest paths, the SC-aware PCE may select that only the paths that satisfy the information provided in the SC table and the node-SF map. A path is determined to satisfy the SC table and the node-SF map when the path traverses through at least some of the network locations that provide the SFs. For example, when the SC table specific an SF sequence for an SC, where the SF sequence comprises an SF type 1 followed by SF type 2, a selected path may traverse through a first network location that provide an SF of type 1 or SF type 1 instance followed by a second network location that provide an SF of type 2 or an SF type 2 instance. In some embodiments, an SF type 1 instance and an SF type 2 instance may be provided by the same network location. After selecting the paths that satisfy the SC table and the node-SF map, the SC-aware PCE may further select a minimum-hop path (e.g., based on a minimum hop criterion specified by the network objective function) from the SC ingress node to the SC egress node. In some embodiments, there may be multiple minimum-hop paths. At step 660, the SC-aware PCE provides a route list comprising the selected minimum-hop paths to the SDN controller. At step 670, upon receiving the route list, the SDN controller configures network nodes, such as the network nodes 240, according to the received route list. Alternatively, the SDN controller may send the route list to a network node, such as the SC ingress node 241, and allow the network node to select a path from the route list. It should be noted that in some embodiments, the SDN controller may request path computation for multiple source-destination pairs at step 640 and the SC-aware PCE may respond with multiple route lists corresponding to the request at step 660.

Figure 7:
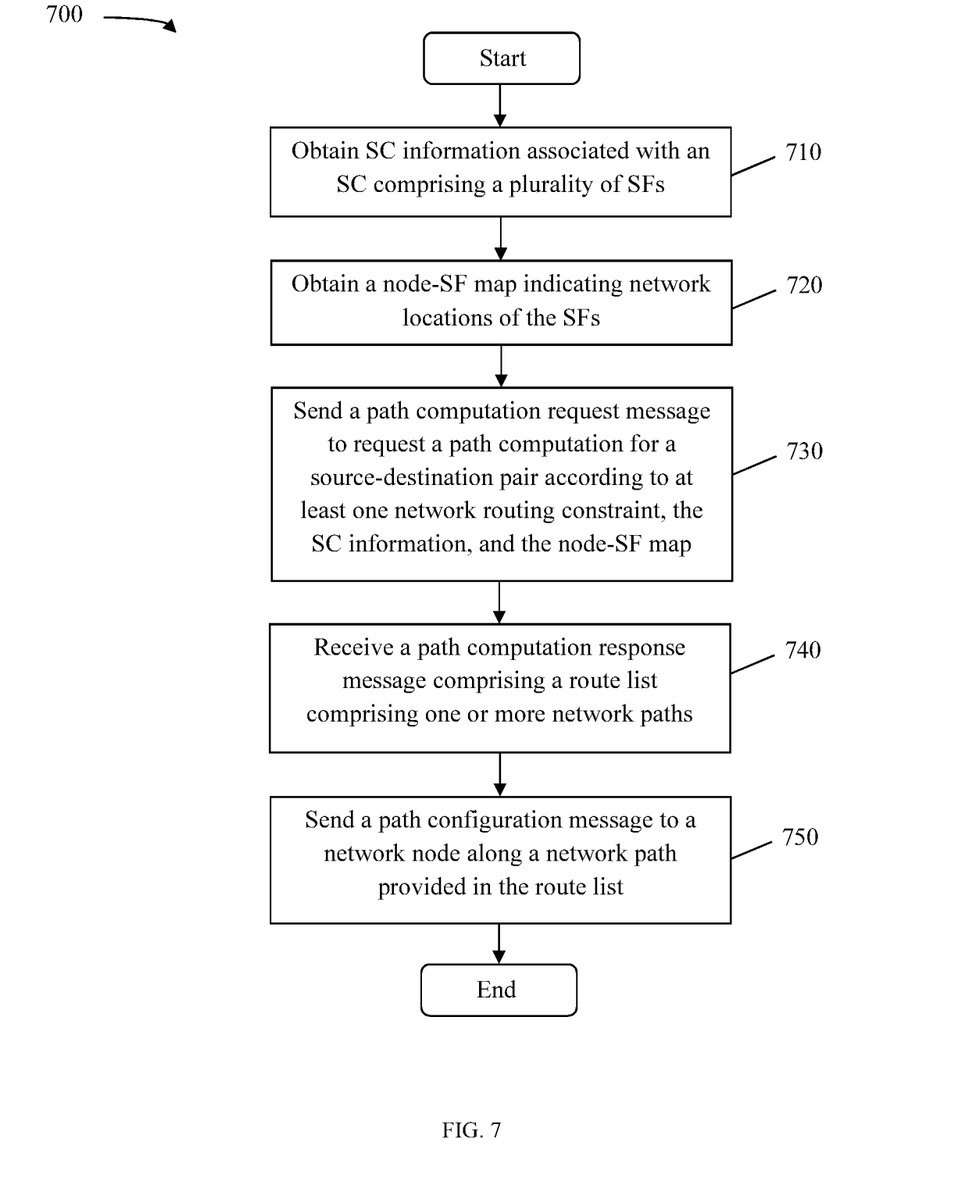
FIG. 7 is a flowchart of an embodiment of an SC-aware path provision method.

FIG. 7 is a flowchart of an embodiment of an SC-aware path provision method 700. The method 700 is implemented by an NE, such as the SDN controller 220 and an NE 300. The method 700 is implemented when determining SC-aware network paths, such as the SC-aware network paths 231 and 232, for an SC network, such as the network 230. The method 700 employs similar mechanisms as described in the architecture 200 and/or the method 600. At step 710, SC information, such as the SCs table 260 and 400, is obtained, for example, from an SC orchestration entity, such as the SC orchestrator 110. The SC information is associated with an SC comprising a plurality of SFs. At step 720, a node-SF map, such as the node-SF maps 270 and 500, is received. The node-SF map indicates network location of the SFs.

At step 730, a path computation request message is sent, for example, to a PCE such as the SC-aware PCE 250. The path computation request message requests a path computation for a source-destination pair according to at least one network routing constraint, the SC information, and the node-SF map. The source-destination pair corresponds to an SC ingress node, such as the SC ingress node 241, and an SC egress node, such as the SC egress node 244. The network routing constraint may comprise a minimum hop, a minimum delay, and/or a minimum bandwidth. The network routing constraint may be determined by the SDN controller and/or in conjunction with other network management entity. In one embodiment, the path computation request message may be sent when the SDN controller determines service overlay paths for the orchestration entity upon an SC creation. In another embodiment, the path computation request message may be triggered by a path request message received from an SC ingress node when the SC ingress node receives data associated with the SC.

At step 740, a path computation response message is received, for example, from the PCE, in response to the path computation request message. The path computation response message comprises a route list comprising one or more network paths for the source-destination pair, where each network path satisfies the network routing constraint and traverses through at least some the network locations of the SFs. For example, some of the SFs are instantiated at multiple network nodes as shown in the network 230, which comprises two instances 281 and 282 for SF type 1 and two instances 283 and 284 for SF type 2. Thus, a network path that enables the application of SFs to a data flow may traverse through a set of network locations that provides one instance for each SF.

At step 750, a path configuration message is sent, for example, to a network node, such as the SC ingress node 241, the SC egress node 244, and/or the network nodes 240, along a network path provided in the route list. The path configuration message indicates the network paths from the received path computation response message. In one embodiment, the route list may comprise more than one network paths for the source-destination pair comprising the same link cost. The SDN controller may send all the network paths provided in the route list to the SC ingress node, which may subsequently select a network path according to the configured network paths. In another embodiment, the SDN controller may select one of the network paths from the route list and configure all the network nodes along the network path.

Figure 8:
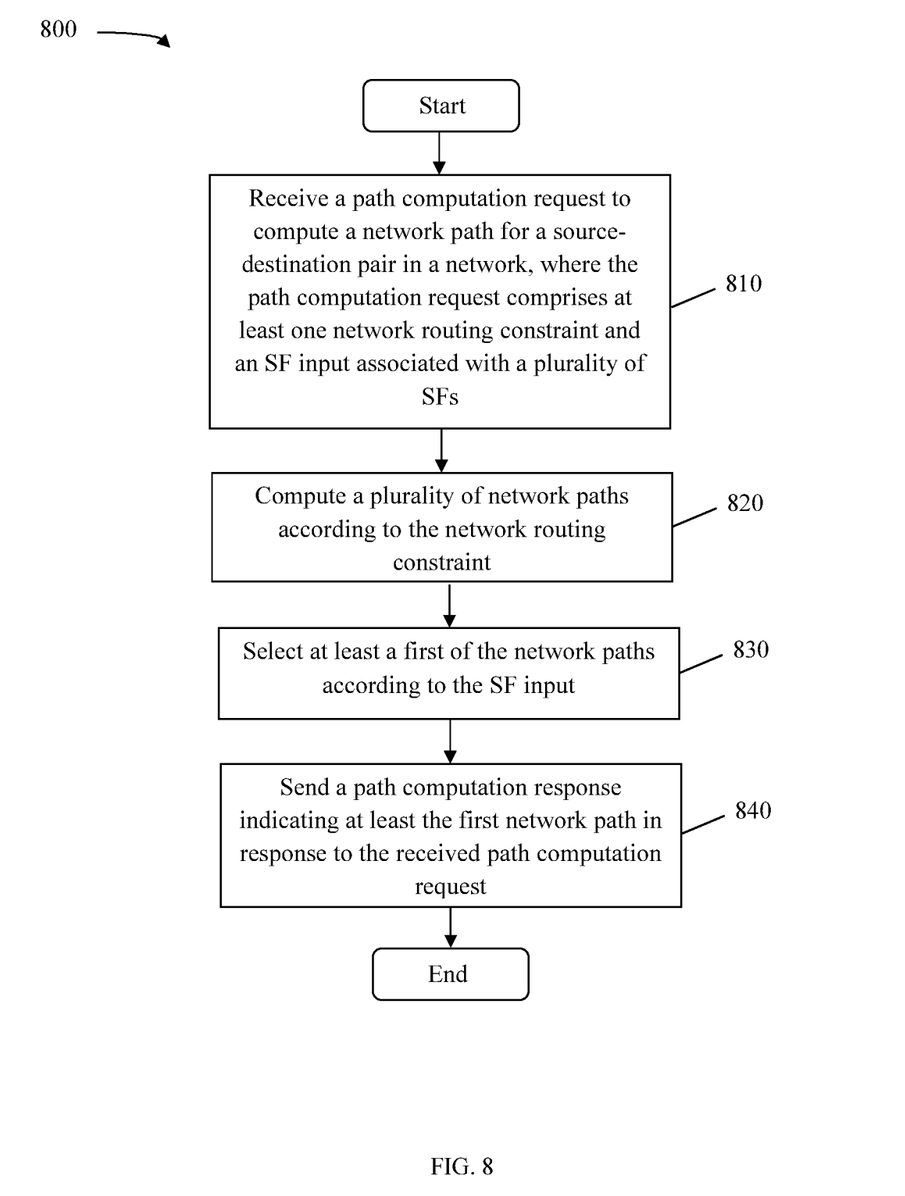
FIG. 8 is a flowchart of an embodiment of an SC-aware path computation method.

FIG. 8 is a flowchart of an embodiment of an SC-aware path computation method 800. The method 800 is implemented by an NE, such as the SC-aware PCE 250 and an NE 300. The method 800 employs similar mechanisms as described in the architecture 200 and/or the method 600. The method 800 begins at step 810 when a path computation request to compute a network path for a source-destination pair in a network, such as the SC network 230, is received, for example, from a network controller. The source-destination pair comprises an SC ingress node, such as the SC ingress nodes 141 and 241, and an SC egress node, such as the SC egress nodes 144 and 244. The path computation request comprises at least one network routing constraint (e.g., QoS parameter) and an SF input associated with a plurality of SFs. For example, the SF input may include SCs and corresponding SF sequences similar to the information shown in the SC tables 260 and 400 and/or locations of the network nodes that provides instances of the SFs similar to the information shown in the node-SF maps 270 and 500. At step 820, a plurality of network paths is computed for the source-destination pair according to the network routing constraints. For example, the PCE may compute the plurality of network paths by applying a K shortest path algorithm based on network topology information and the network routing constraints. The network topology information may be stored locally at the PCE or may be obtained from another network entity in the network. In an embodiment, the network topology information may comprise a link state database (LSDB) comprising a plurality of network links (e.g., between a pair of network nodes 240) in the network and link costs associated with the network links. In such an embodiment, the PCE computes the plurality of network paths by determining that the plurality of network paths comprises a minimum cost and satisfies the network routing constraint. At step 830, at least a first of the network paths is selected according to the SF input. For example, when the SFs indicated by the SF input are associated with an SC, the PCE may select network paths that traverse through a set of the network nodes that provide an instance for each SF. At step 840, a path request response is sent, for example, to the network controller, in response to the path request message. The path computation response indicates at least the first network path. In some embodiments, the PCE may determine that more than one network paths satisfy the network routing constraints and conforms to the SF input. In such embodiments, the PCE may further select a network path that comprises a minimum number of hops. When there are more than one network paths comprising the same minimum number of hops, the PCE may provide all the selected minimum-hops network paths to the network controller and allow the network controller to perform the final path selection or the network controller may subsequently provide all the selected minimum-hops network paths to the SC ingress node and allow the SC ingress node to perform the final path selection.

Figure 9:
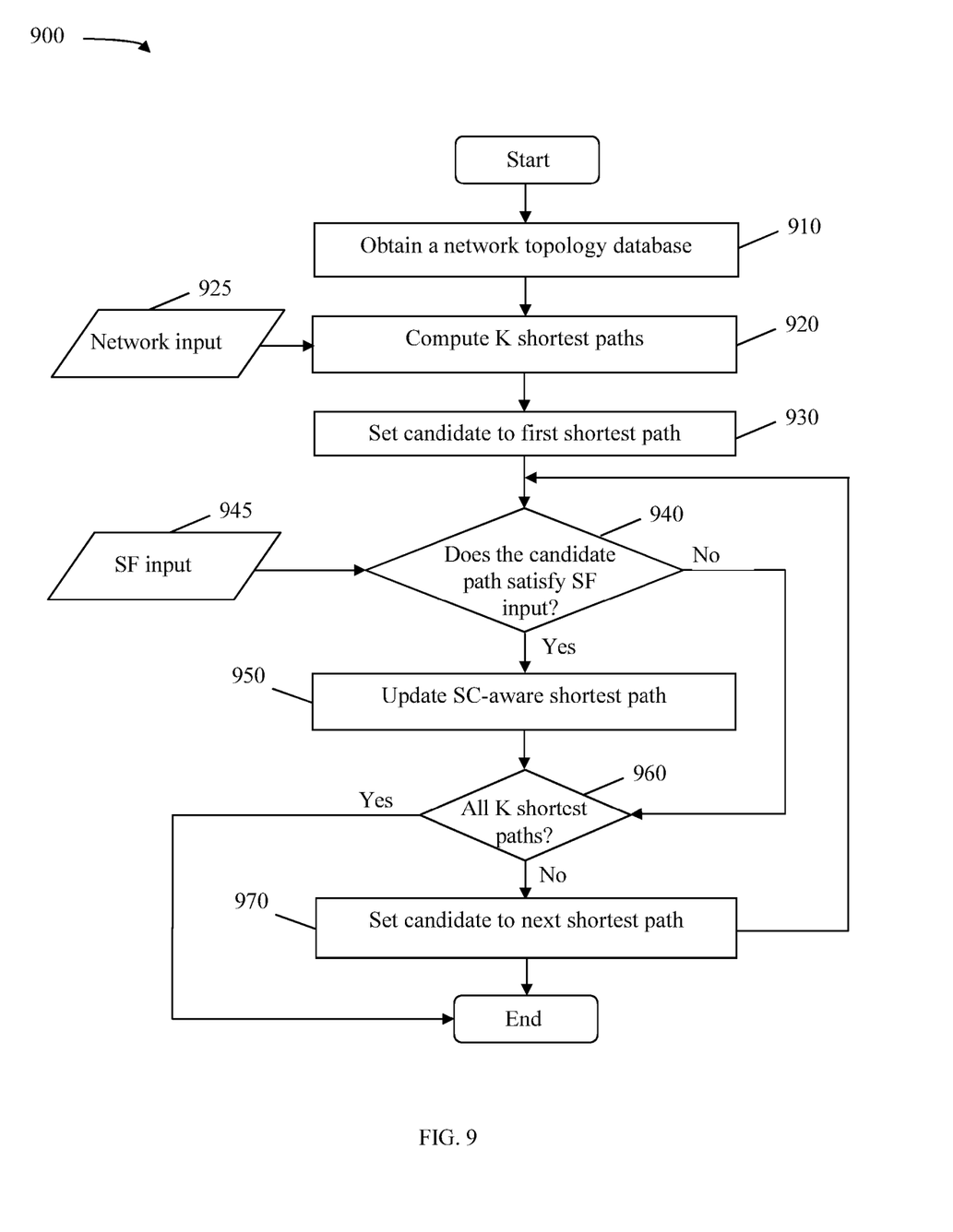
FIG. 9 is a flowchart of another embodiment of an SC-aware path computation method.

FIG. 9 is a flowchart of another embodiment of an SC-aware path computation method 900. The method 900 is implemented by an NE, such as the SC-aware PCE 250 and an NE 300. The method 900 is implemented when receiving an SC-aware path computation request, for example, from an SDN controller, such as the SDN controller 220. The method 900 is similar to the method 800 and employs similar mechanisms as described in the architecture 200 and/or the method 600. At step 910, a network topology database is obtained. The network topology database may be an Open Shortest Path First (OSPF) LSDB. At step 920, K shortest paths are computed according to the network input 925 and the network topology database. For example, the network input 925 may comprise a source address (e.g., a network address of an SC ingress nodes 141 and 241), a destination address (e.g., a network address of an SC egress nodes 144 and 244), and a network objective function. Thus, the K shortest path is computed from the source to the destination. The network objective function may specify for a minimum hop path with about 5 megabits per second (Mbps) minimum bandwidth or any other network objectives suitable for routing. At step 930, after computing the K shortest path, a candidate path is set to the first shortest path. At step 940, a determination is made whether the candidate path satisfies the SF input 945. For example, the SF input 945 may comprise an SC profile (e.g., SC tables 260 and 400) comprising an ordered set of SFs and an SF location profile (e.g., node-SF maps 270 and 500) comprising network locations of the SFs. A candidate path that satisfies the SF input traverses all the SFs or instances of the SFs such that data directed along the candidate path may be processed by all the SFs specified for the SC. If the candidate path is determined to satisfy the SF input, the method 900 proceeds to step 950, otherwise the method 900 proceeds to step 960. At step 950, an SC-aware shortest path list is updated. For example, the candidate path may replace a previous SC-aware shortest path when the candidate path comprises a more optimized measure according to the network objective function (e.g., less number of hops) than the previous SC-aware shortest path.

At step 960, a determination is made whether all the K shortest paths have been tested against the SF input 945. If all the K shortest paths have been tested against the SF input 9445, the method 900 terminates, otherwise the method 900 proceeds to step 970. At step 970, the candidate path is set to a next shortest path and the loop of step 940 to step 970 is repeated.

Figure 10:
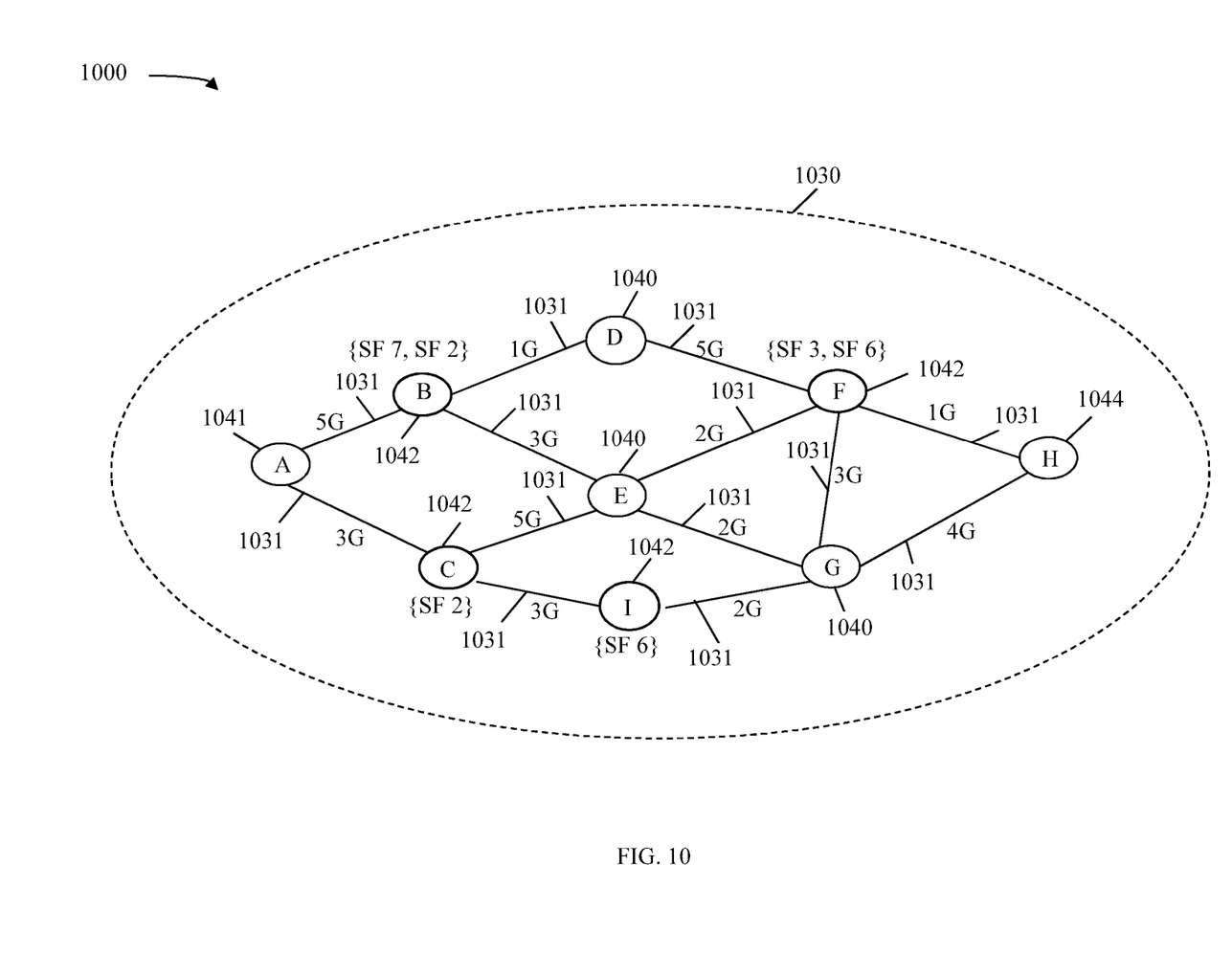
FIG. 10 illustrates an embodiment of an SC-aware path computation scenario.

FIG. 10 illustrates an embodiment of an SC-aware path computation scenario 1000 for an SC network 1030, such as the networks 130 and 230. The SC network 1030 comprises an SC ingress node 1041 (e.g., node A), an SC egress node 1044 (e.g., node H), a plurality of SF steering nodes 1042 (e.g., node B, C, F, and I), and a plurality of data-forwarding nodes 1040 (e.g., node D, E, and G) interconnected by a plurality of links 1031. The SC ingress node 1041 is similar to the SC ingress nodes 141 and 241. The SC egress node 1044 is similar to the SC egress nodes 144 and 244. The SF steering nodes 1042 are similar to the SF steering nodes 142 and network nodes B, C, and D 240. As shown, the SF steering nodes B 1042 provides SF instances for SF types 7 and 2, the SF steering nodes C 1042 provides an SF instance for SF type 2, the SF steering nodes F 1042 provides SF instances for SF type 3 and SF type 6, and the SF steering nodes I 1042 provides an SF instance for SF type 6. The data-forwarding nodes 1040 are similar to the network nodes A and E 240. The links 1031 may comprise logical links, physical links, and/or any types of links that are suitable for transporting data. As shown, the links 1031 comprise 1G links, 2G links, 3G links, 4G links, and 5G links. In an embodiment, the network 1030 may employ a Multi-Protocol Label Switching (MPLS) transport network. Thus, the links 1031 may represent Label Switched Paths (LSPs). A network topology information base may include the data-forwarding nodes 1040, the SF steering nodes 1042, the links 1031, and/or the link costs and/or path types for the links 1031.

In an embodiment, an SC-aware PCE, such as the SC-aware PCE 250, receives a path computation request to compute a path from the SC ingress node 1041 to the SC egress node 1044 to meet SC requirements or SC constraints and a network routing objective function. For example, the SC is composed of an SF type 2 followed by an SF type 6 and the network objective function indicates a minimum 2G bandwidth LSP. The SC-aware PCE may employ similar mechanisms as described in the methods 600, 800, and 900 to find an optimal SC-aware path. The SC-aware PCE computes a set of paths from the SC ingress node 1041 to the SC egress node 1044 according to the network topology information base and the network objective function (e.g., similar to the step 820 of the method 800 and the step 920 of the method 900). The following table illustrates a list of paths (e.g., Path 1, Path 2, Path 3, and Path 4 ) from the SC ingress node 1041 to the SC egress node 1044 that satisfy the network objective function:

TABLE 1

List of Paths that Satisfies the Network Objective Function

| | |
|---|---|
| Path 1 | A-B-E-F-G-H |
| Path 2 | A-B-E-G-H |
| Path 3 | A-C-E-F-G-H |
| Path 4 | A-C-E-G-H |
| Path 5 | A-C-I-G-H |

After computing the paths, the SC-aware PCE determines whether the computed paths meet the SC requirements (e.g., similar to the step 830 of the method 800 and the step 940 of the method 900). For example, a path is determined to meet the SC requirements when the path traverses through a network location that provides an SF type 2 instance and then a network location that provides an SF type 6 instance. As such, paths 2 and 4 fail to meet the SC requirements. Thus, the SC-aware PCE may select Path 1, Path 3, and Path 5 as candidate paths as shown in the following table:

TABLE 2

List of Paths that Satisfies the SC Requirements

| | |
|---|---|
| Path 1 | A-B-E-F-G-H |
| Path 3 | A-C-E-F-G-H |
| Path 5 | A-C-I-G-H |

After selecting the candidate paths, the SC-aware PCE may further select the path comprising the minimum number of hops. As shown, Path 5 comprises 4 hops, while Path 1 and Path 3 comprise 5 hops. Thus, the SC-aware PCE selects Path 5 as the optimal SC-aware path.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
receiving, by a path computation element (PCE), a path computation request from a network controller to compute a network path between a source and a destination in a network, wherein the path computation request comprises a service function (SF) input associated with a plurality of SFs;
computing, by the PCE, a plurality of shortest paths through the network from the source to the destination;
comparing, by the PCE, each of the plurality of shortest paths to the SF input;
selecting, by the PCE and according to the SF input, a service chain (SC) aware shortest path from among the plurality of shortest paths when the SC aware shortest path satisfies the SF input; and
sending, by the PCE, a path computation response to the network controller in response to the received path computation request and the selection of the SC aware shortest path, wherein the path computation response comprises the SC aware shortest path as the network path.

2. The method of claim 1, further comprising obtaining, by the PCE, network topology information that describes a plurality of nodes in the network.

3. The method of claim 1, wherein the path computation request further comprises a network input comprising an address of the source, an address of the destination, and a network objective function.

4. The method of claim 3, wherein the SC aware shortest path further satisfies the network objective function, wherein the network objective function describes an optimization metric for the network path.

5. The method of claim 1, wherein the SF input comprises a SC profile comprising an ordered listing of SFs and locations.

6. The method of claim 5, wherein the SC aware shortest path satisfies the SF input when the SC aware shortest path traverses each node indicated in the ordered listing of SFs and locations.

7. The method of claim 5, wherein the SC aware shortest path satisfies the SF input when the SC aware shortest path traverses at least some nodes indicated in the ordered listing of SFs and locations.

8. A network element, comprising:
a memory comprising instructions executable by a processor; and
a processor coupled to the memory and configured to execute the instructions, wherein executing the instructions causes the processor to:
obtain a network topology database responsive to receiving, from a network controller, a path computation request to determine a network path through a network, wherein the path computation request comprises a service function (SF) input describing a plurality of SF nodes in the network, and wherein each of the plurality of nodes is associated with a SF;

compute a plurality of shortest paths through the network according to the path computation request;

compare each of the plurality of shortest paths to the SF input;

select, according to the SF input, a service chain (SC) aware shortest path from among the plurality of shortest paths when the SC aware shortest path satisfies the SF input; and send a path computation response to the network controller in response to the received path computation request and the selection of the SC aware shortest path, wherein the path computation response comprises the SC aware shortest path as the network path.

9. The network element of claim 8, wherein the path computation request further comprises a network objective function, and wherein executing the instructions further causes the processor to further select the SC aware shortest path according to the network objective function.

10. The network element of claim 9, wherein the network objective function comprises a quality-of-service (QoS) parameter.

11. The network element of claim 10, wherein executing the instructions further causes the processor to compute the plurality of shortest paths according to the network objective function.

12. The network element of claim 8, wherein executing the instructions further causes the processor to determine that the SC aware shortest path satisfies the SF input when the SC aware shortest path traverses each of the plurality of SF nodes in the network.

13. The network element of claim 8, wherein the network topology database is a link state database (LSDB).

14. The network element of claim 8, wherein executing the instructions further causes the processor to select, according to the SF input, a second SC aware shortest path, and wherein the path computation response further comprises the second SC aware shortest path.

15. A method, comprising:

sending, by a network controller, a path computation request to request computation by a path computation element of a network path through a network from a source to a destination, wherein the path computation request comprises a service function (SF) input associated with a plurality of SFs;

receiving, by the network controller, a path computation response message comprising a service chain (SC) aware shortest path from the source to the destination, wherein the SC aware shortest path satisfies the SF input; and sending, by the network controller, a path configuration message to a network node located along the SC aware shortest path.

16. The method of claim 15, wherein the SF input indicates a plurality of SFs and network locations of nodes associated with the plurality of SFs.

17. The method of claim 16, wherein the SC aware shortest path satisfies the SF input when the SC aware shortest path traverses each node associated with the plurality of SFs.

18. The method of claim 16, wherein the SC aware shortest path satisfies the SF input when the SC aware shortest path traverses at least some nodes associated with the plurality of SFs.

19. The method of claim 15, wherein the path computation request further comprises a network objective function comprising a quality-of-service (QoS) attribute, and wherein the SC aware shortest path received in the path computation response message satisfies the network objective function.

20. The method of claim 19, wherein the QoS attribute describes a minimum-hop criterion, a path type, a bandwidth, a delay, or combinations thereof.

* * * * *